United States Patent

Shallenberger

[11] Patent Number: 5,816,754
[45] Date of Patent: Oct. 6, 1998

[54] ELONGATED DRILL WITH REPLACEABLE CUTTING INSERTS

[75] Inventor: Fred T. Shallenberger, Rockford, Ill.

[73] Assignee: Greenfield Industries, Augusta, Ga.

[21] Appl. No.: 746,033

[22] Filed: Nov. 6, 1996

[51] Int. Cl.$^6$ ...................................................... B23B 51/02
[52] U.S. Cl. .................... 408/227; 408/229; 408/705; 408/713
[58] Field of Search ..................... 408/187, 188, 408/229, 230, 713, 704, 705, 227

[56] References Cited

U.S. PATENT DOCUMENTS

| | | | |
|---|---|---|---|
| 3,963,365 | 6/1976 | Shallenberger | 408/186 |
| 4,373,839 | 2/1983 | Negishi et al. | 408/59 |
| 4,813,823 | 3/1989 | Bieneck | 408/230 |
| 5,035,552 | 7/1991 | Lysenko et al. | 408/230 |
| 5,092,718 | 3/1992 | Shallenberger | 408/188 |
| 5,174,691 | 12/1992 | Shepley | 408/230 |
| 5,304,020 | 4/1994 | Reccius | 408/705 |

FOREIGN PATENT DOCUMENTS

| | | | |
|---|---|---|---|
| 1477244 | 9/1969 | Germany | 408/705 |
| 4117486 | 12/1992 | Germany | 408/230 |
| 521074 | 9/1976 | U.S.S.R. | 408/230 |

*Primary Examiner*—Daniel W. Howell
*Attorney, Agent, or Firm*—Leydig, Voit & Mayer, Ltd.

[57] ABSTRACT

A metal cutting drill with replaceable cutting inserts and a length to diameter ratio of four to one or more. Two cutting inserts are positioned in exactly opposed diametric positions, and engage the workpiece in a substantially identical manner to precisely balance the radial forces resulting from drill axially advancing though a workpiece. Through the use of dual cutting inserts, the drill cuts the full circumference of a bore with each one-half revolution and therefore achieves the a faster axial feed rate. By virtue of the inserts being triangular, the curved corners on the cutting edges of the two inserts may be positioned relatively close together and yet sufficient space is left between the inserts to enable the drill shank between the inserts to be relatively thick and strong even at increased length to diameter ratios. Through the provision of a length to diameter ratio greater than four to one, the bores which the drill is able to produce are substantially deeper at any given diameter than those achievable by prior art indexable drills.

8 Claims, 5 Drawing Sheets

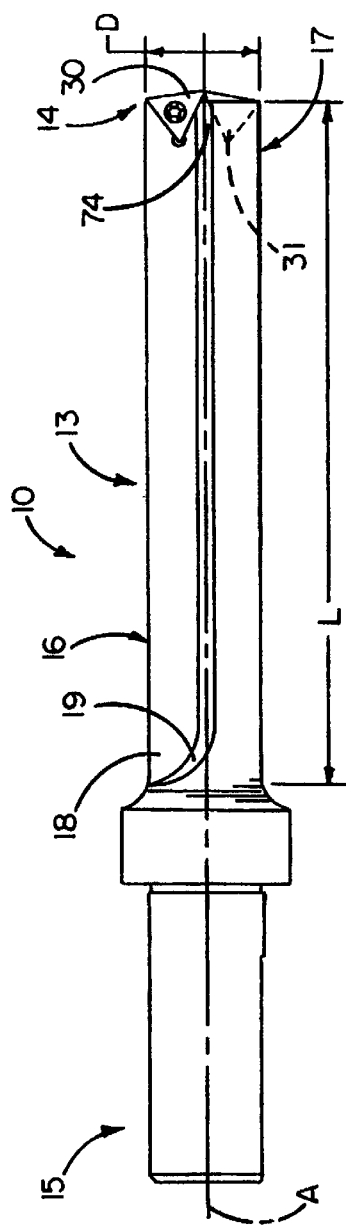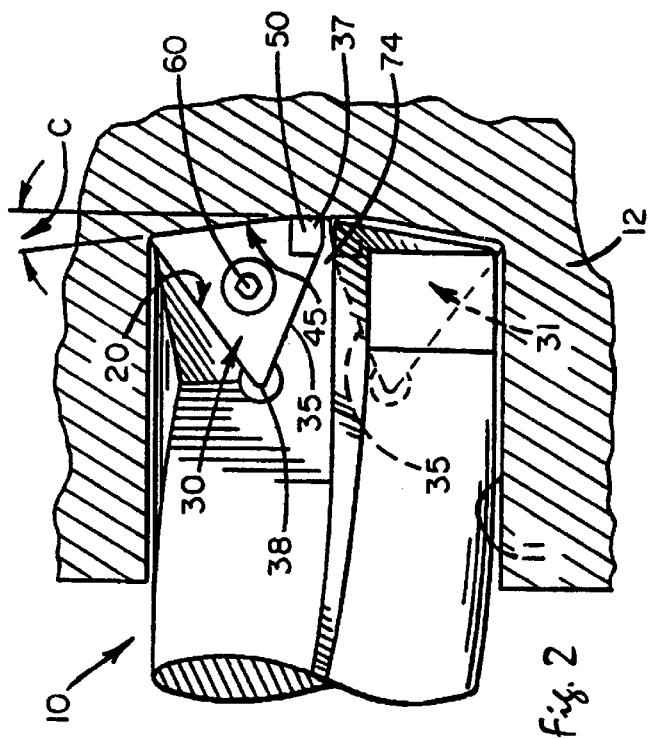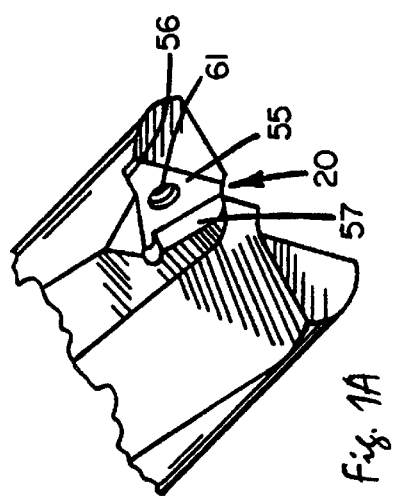

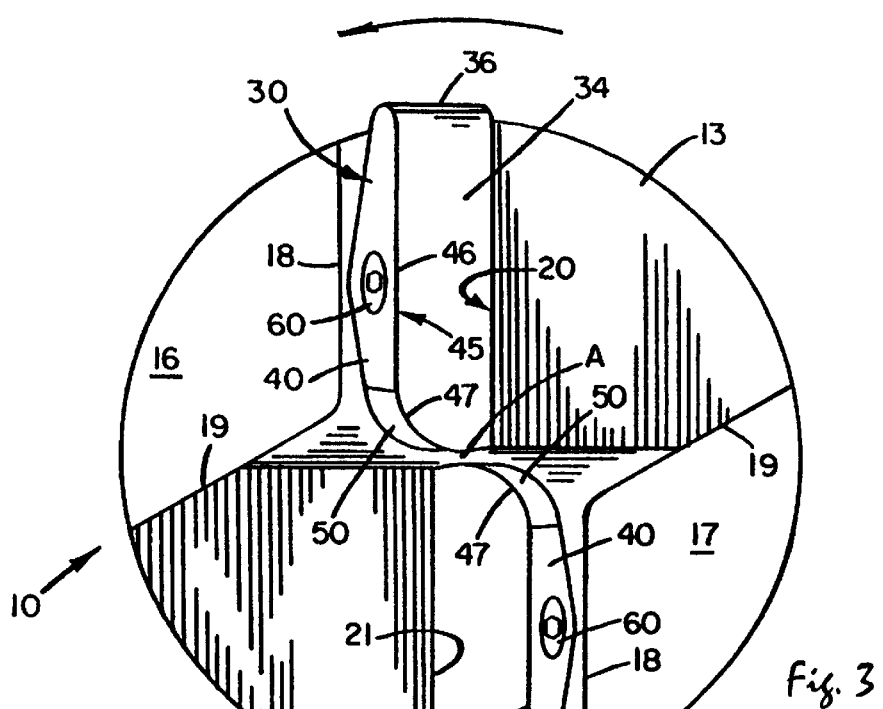
fig. 3
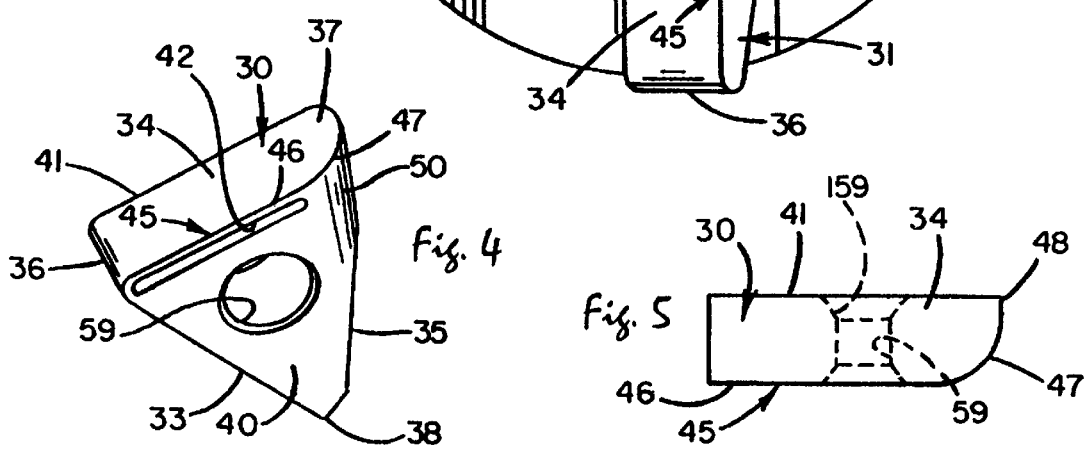
fig. 4
fig. 5
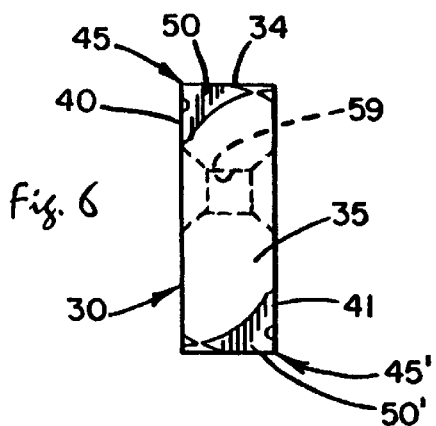
fig. 6
fig. 7

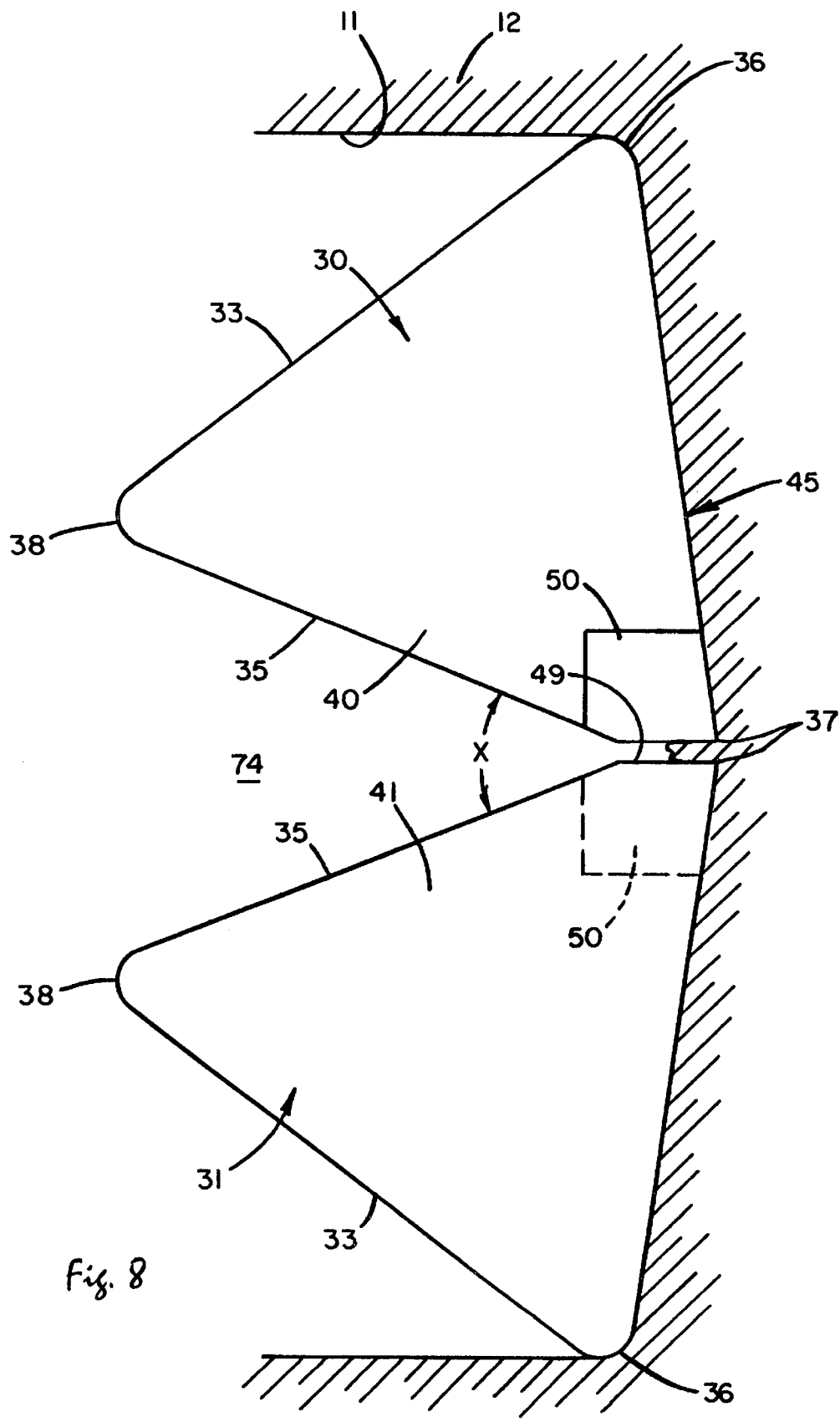

ELONGATED DRILL WITH REPLACEABLE CUTTING INSERTS

FIELD OF THE INVENTION

This invention generally relates to drills for forming holes in metal workpieces, and more particularly relates to drills having replaceable cutting inserts.

BACKGROUND OF THE INVENTION

Metal boring tools and drills commonly employ replaceable cutting inserts which allow the shaft of the drill to be repeatedly used while only replacing, or resharpening, the cutting inserts. This results in a longer lasting drill with less maintenance costs. Such a drill is disclosed in Shallenberger, Jr. U.S. Pat. No. 3,963,365. In that drill, one insert is an outer insert which removes metal from the peripheral wall of the hole and inwardly toward the center of the hole in a cutting arc whose width is equal to one-half the radius of the hole. The other insert is an inner insert which removes metal from the center of the hole and outwardly toward the peripheral wall of the hole in a cutting arc of substantially equal width.

While drills of the type disclosed in the Shallenberger, Jr. patent have enjoyed significant commercial success, the axial feed rate of such a drill is relatively slow due to the fact that a full revolution of the drill is required to cut the full circumference of the hole.

Negishi, et al U.S. Pat. No. 4,373,839 discloses a drill which may be fed axially at a rate approximately twice that of the Shallenberger, Jr. drill. This is because the two cutting blades of the Negishi drill are positioned so as to cut the entire circumference of the hole during each one-half revolution of the drill.

Shallenberger U.S. Pat. No. 5,092,718 provides a drill with two replaceable cutting inserts which each span virtually one-half of the diameter of the drill. A relatively small portion is left in the center of the workpiece which can be easily removed by fragmentation as the tip end of the drill is advanced axially. With such a design the cutting inserts are preferably triangular in shape, although other shapes are possible, and the flutes of the drill bit are provided with pockets to receive the cutting inserts. A relatively wide portion of the drill shank is disposed between the cutting inserts to impart strength to the drill.

Metal cutting drills with indexable inserts have enjoyed considerable success in a wide variety of applications. One area where success has been lacking, however, is the drilling of rather deep holes of comparatively smaller diameter. Since insert-type drills have had good metal removal rates, the cutting forces can be rather high, and it has been the practice to make the shanks relatively robust in order to withstand the drilling forces without bending, cocking, or deformation. Thus, it had been the practice as the drill diameter became smaller, and thus the shank thinner, to limit the length of the drill. A ratio, known as the length to diameter ratio, is a rule of thumb which relates the diameter of the hole which is being drilled to the depth which can be drilled (i.e. the length of the tool), and it has been practice in the industry to limit the length to diameter ratio for indexable insert drills to about three to one. Imbalanced radial forces resulting from the interaction of the cutting inserts with the workpiece during drilling were believed to require the limitation on the length to diameter ratio. The depth of a bore which could therefore be formed in the workpiece with an indexable drill of a given diameter was thus necessarily limited by this ratio.

SUMMARY OF THE INVENTION

The primary objective of the present invention is to provide a new and improved drill of the same general type as that disclosed in Shallenberger, U.S. Pat. No. 5,092,718, but having a length which is substantially greater than its diameter to enable the drill to produce relatively deep bores as compared to their diameters.

In that regard, a feature of the present invention is the provision of a drill with precisely balanced cutting inserts such that the radial forces generated by the cutting action are balanced between the inserts, and thus substantially cancel each other.

Another feature of the present invention is the provision of cutting inserts which extend from the shank pockets in an identical manner so as to engage the workpiece in an identical manner and thereby place substantially identical loads on each cutting insert.

Another feature of the present invention is the provision of a drill having inserts with uniquely curved cutting edges and steeply inclined sides which enables the cutting edges of the cutting inserts to be positioned closely adjacent one another while leaving a strong section of drill shank between the sides of the inserts to impart strength to the drill even at length to diameter ratios greater than three to one.

Another feature of the present invention is the provision of a drill with a length to diameter ratio of four to one or more.

These and other objectives and features of the invention will become more apparent from the following detailed description when taken in conjunction with the accompanying drawings.

BRIEF DESCRIPTION OF THE DRAWINGS

FIG. 1 is a side elevational view of one embodiment of the present invention.

FIG. 1A is an enlarged fragmentary perspective view of the tip end portion of the drill illustrated in FIG. 1 but showing the drill with both of the inserts removed.

FIG. 2 is an enlarged fragmentary side elevational view of the drill illustrated in FIG. 1 and shows the drill forming a hole in a workpiece.

FIG. 3 is an enlarged end view of the drill.

FIG. 4 is a perspective view of one of the triangular inserts.

FIG. 5 is a top plan view of the insert.

FIG. 6 is a front elevational view of the insert.

FIG. 7 is an edge view of the insert as seen from the right of FIG. 6.

FIG. 8 is an enlarged schematic view showing the inserts drilling a hole.

Figure 9A:
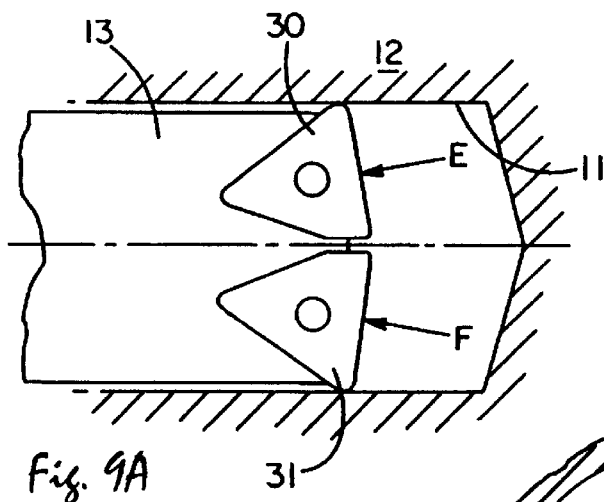
FIG. 9A is a schematic side view of the present invention with the workpiece bore formed by the drill shown in cross-section.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

As shown in the drawings for purposes of illustration, the invention is embodied in drill 10 for forming cylindrical bore 11 (FIGS. 2 and 8) in workpiece 12 made of iron, steel or other metal. Drill 10 includes elongated and generally cylindrical body 13, which is the preferred embodiment is made of high carbon steel, and has tip end 14 and opposite shank end 15. However, other materials having similar physical characteristics are possible. Shank end 15 of body 13 is adapted to be clamped in a power-rotated holder (not shown) for effecting rotation of drill 10 about its own axis A (FIG. 3), the rotation herein being in a counterclockwise direction as viewed in FIGS. 1 and 3. It will be appreciated that drill 10 could be held rotationally stationary and that workpiece 12 could be rotated about axis A of drill 10.

Two generally diametrically or equilaterally spaced flutes 16 and 17 are formed in body 13 to carry chips away from the end 14. The flutes preferably extend helically (FIGS. 1 and 2) around and along body 13 from tip end 14 toward shank end 15 to enable metal chips to be carried from bore 11. Alternatively the flutes can be straight as in FIG. 1. Each flute is generally V-shaped in radial cross-section and is defined by a pair of walls 18 and 19. Wall 18 of each flute faces generally in the direction of rotation while wall 19 faces generally opposite to the direction of rotation.

Generally diametrically spaced pockets 20 and 21 (FIGS. 1A and 3) are formed in body 13 adjacent the tip end portions of flutes 16 and 17, respectively, each pocket being formed near wall 18 of the respective flute. Although pockets 20 and 21 are generally diametrically spaced apart in the preferred embodiment, it is to be understood that the present invention covers further embodiments wherein the pockets are otherwise equidistantly spaced apart. Replaceable cutting inserts 30 and 31 are seated in pockets 20 and 21, respectively, and act to cut bore 11 in workpiece 12 when drill 10 is rotated counterclockwise about axis A.

In accordance with the present invention, each cutting insert 30, 31 is generally triangular in shape and is formed with a specially configured corner. As will become apparent subsequently, the use of triangular inserts enables a full circumference of bore 11 to be cut during each one-half revolution of drill 10 while permitting tip end portion 14 of the drill to be sufficiently strong to withstand heavy cutting forces imposed on inserts 30, 31. However, alternatively shaped inserts are possible.

Insert 30 is shown in detail in FIGS. 4 and 7, it being understood that insert 31 is identical to the insert 30. As shown, insert 30 is generally in the shape of an equilateral triangle and includes three sides or edge surfaces 33, 34 and 35 of substantially equal length and joining one another at three corners 36, 37 and 38. The three edge surfaces extend between two oppositely facing and generally planar face surfaces 40 and 41. Each face surface 40, 41 of each insert is formed with a conventional chip-breaking groove 42 (FIGS. 4 and 6) which is located just inwardly of the periphery of the face surface.

With each insert 30, 31 properly seated in its respective pocket 20, 21 as shown in FIG. 3, face surfaces 40 of each insert 30, 31 face in the direction of rotation and defines a cutting face. Cutting edge 45 is defined at the junction of face surface 40 and edge surface 34 and, as the cutting edge proceeds from corner 36 toward corner 37, it is straight along most of its length as indicated at 46. Upon approaching corner 37, cutting edge 45 starts curving convexly and curves convexly out of the plane of the surface 40 and toward the plane of face surface 41 as the cutting edge proceeds around the corner. Curved portion 47 of the cutting edge 45 curves around until meeting plane 41 at point 48. (FIG. 5) As a result, edge 49 is formed in plane 41 which is not parallel to edge 35.

Formation of curved portion 47 of each cutting edge 45 is effected by appropriately grinding or otherwise forming the portions of face surface 40 and edge surface 35 adjacent corner 37 of insert 30, 31. As a result, the corner portion of face surface 40 and edge surface 35 are convexly curved as indicated at 50 in FIG. 4.

Pockets 20 and 21 for inserts 30 and 31, respectively, each include a flat platform 55 (FIG. 1A) against which face 41 of each insert 30, 31 is seated. Two side walls 56 and 57 project from each platform and are angled relative to one another so as to cause pocket 20, 21 to be formed with generally V-shaped configurations. When each insert 30, 31 is located in its respective pocket, edge surfaces 33 and 35 seat against side walls 56 and 57, respectively, and thus corner 38 of each insert points toward shank end 15 of drill body 13.

Hole 59 (FIG. 4) is formed through each insert 30, 31 and extends between and perpendicular to face surfaces 40 and 41 of each insert. As best shown in FIG. 5, hole 59 includes countersinks 159 at opposite ends to accommodate the heads of screws 60. To secure inserts 30, 31 in pockets 20, 21, threaded screw or locking pin 60 (FIGS. 2 and 3) extends through each hole 59 and is threaded into tapped hole 61 (FIG. 1A) in platform 55.

Platform 55 of each pocket 20, 21 is inclined relative to axis A so as to cause cutting edge 45 of each insert 30, 31 to be disposed at a negative axial rake angle, meaning that leading cutting face 40 of each insert 30, 31 is located ahead of cutting edge 45. As a result, the edge surface 34 of each insert 30, 31 is tipped in such a direction as to define a clearance face and to avoid rubbing against the bottom of bore 11 during drilling thereof. In this particular instance, the negative axial rake angle is approximately seven degrees.

Each insert 30, 31 also is positioned such that its cutting edge 45 is located at a negative radial rake. That is to say, each cutting edge 45 is positioned ahead of the most nearly adjacent radial line that parallels the cutting edge and thus corner 36 of each insert 30, 31 behind cutting edge 45 clears the peripheral wall of bore 11 so as to avoid rubbing against such wall. Herein, each cutting edge 45 is positioned approximately more than one half the insert thickness ahead of the aforementioned radial line.

Cutting edge 45 of each insert 30, 31 also is inclined at a lead angle C (FIG. 2) of about 8 degrees. As a result of the lead angle, cutting edge 45 slopes toward shank end 15 of body 13 as the edge progresses outwardly toward the peripheral wall of bore 11. This causes the center portion of bore 11 to be cut somewhat prior to cutting of the peripheral portion and facilitates initial penetration of drill 10 into the workpiece 12.

With the foregoing arrangement, rotation of drill 10 causes cutting edge 45 of each insert 30, 31 to cut across almost a full radius of bore 11 as is apparent from FIG. 8. Each cutting edge 45 sweeps around one-half the circumference of bore 11 during each one-half revolution of drill 10 and thus the two cutting edges coact to cut the full circumference of the hole every one-half revolution. This enables rapid axial feeding of drill 10.

Due to curved portions 47 of cutting edges 45, cutting occurs very close to the center of bore 11. To avoid interference between inserts 30 and 31, corners 37 of inserts 30, 31 must be spaced from one another and thus generally cylindrical core 70 (FIG. 8) is left at the bottom of bore 11 between the inserts.

The significance of triangular inserts 30, 31 is most apparent from FIG. 8. Inserts 30, 31 are positioned and angled such that corners 37 are spaced very closely together (i.e., a spacing of between 0.15 and 0.5 millimeter) and thus core 70 is very small in diameter. Accordingly, core 70 may be easily snapped off by edge surfaces 35 adjacent the corners, or simply fragmented by tip end 14 of the drill as the drill advances axially. Because inserts 30, 31 are triangular, edge surfaces 35 of inserts 30, 31 quickly diverge away from one another at a wide angle X of approximately 44 degrees as edge surfaces 35 progress from tip end 14 of drill 10 toward shank end 15. Because of the wide divergence of edge surfaces 35, significant space exists therebetween for the metal of drill body 13. Accordingly, body portion 74 between edge surfaces 35 may be comparatively thick and rugged to a point closely adjacent corners 37 so as to impart strength to body 13. In spite of the relatively large thickness of portion 74 between edge surfaces 35 of the triangular inserts, the fact that edge surfaces 35 converge toward tip end 14 of body 13 allows corners 37 to be located closely adjacent one another so that an easily breakable core 70 of only small diameter is left between the inserts.

Each insert 30, 31 preferably is formed with alternately usable cutting edge 45' which is formed along the junction of face surface 41 with edge surface 33. Other than for location, cutting edge 45' is identical to cutting edge 45 and includes straight and curved portions similar to straight and curved portions 46 and 47 of the cutting edge 45. The straight portion of cutting edge 45' starts at corner 36 and extends to a curved portion located at corner 38. The curved portion of cutting edge 45' is defined by forming convexly curved portion 50' (FIG. 7) on face 41 of inserts 30, 31.

After cutting edge 45 of each insert 30, 31 has become worn, the insert may be removed from the pocket 20, 21. By both inverting and indexing the insert, cutting edge 45' may be brought into active cutting position. Accordingly, each insert includes two alternately usable cutting edges and thus the insert need not be discarded until both edges have been worn.

It will be appreciated by those skilled in the art that the drill tip and insert geometry described thus far in the detailed description corresponds to the geometry and insert description of the aforementioned Shallenberger U.S. Pat. No. 5,092,718. The pockets which receive the inserts in the '718 structure are generally diametrically opposed to each other, and the inserts extend into the workpiece about equally.

That basic geometry, when balanced with precision, has lead to the present invention in which the drill tip geometry is precisely balanced, and the working length (See FIG. 1) of the drill, i.e. the portion of the drill which can extend into a drilled hole, is much longer than has been achievable with prior art indexable drills. It has been found that positioning inserts 30, 31 precisely opposite each other, and projecting from the pockets so that they precisely equally interengage workpiece 12, results in balanced forces at the cutting tip, rather than deflection, deformation, or breakage of the drill.

Figure 9B:
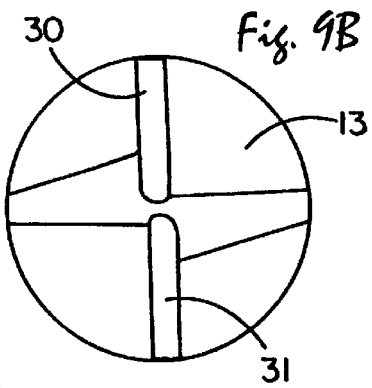
FIG. 9B is a schematic end view of the embodiment shown in FIG. 9A.
Figure 9C:
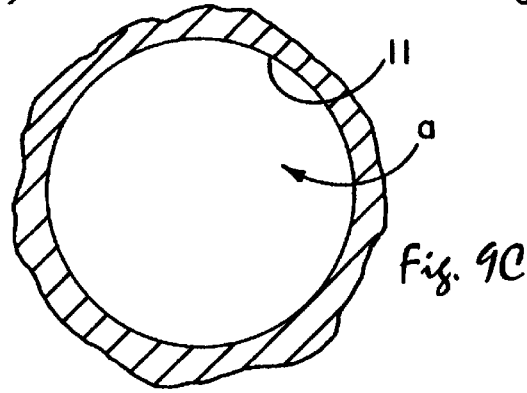
FIG. 9C is a schematic top view of bore profile created by the embodiment shown in FIG. 9A.
Figure 10A:
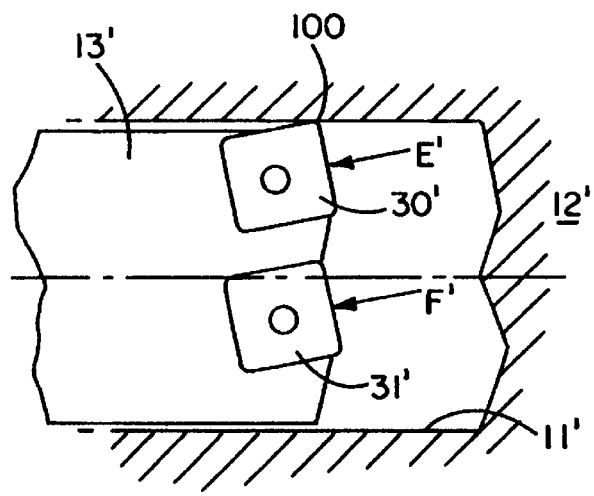
FIG. 10A is a schematic side view of a prior art drill with the workpiece bore formed by the drill shown in cross-section.
Figure 10B:
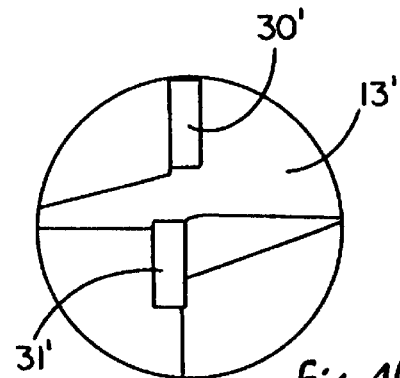
FIG. 10B is a schematic end view of drill shown in FIG. 10A.
Figure 10C:
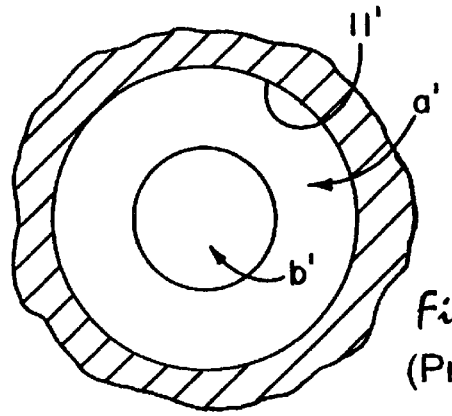
FIG. 10C is a schematic top view of the bore profile created by the drill shown in FIG. 10A.

The manner in which this is accomplished will be better appreciated from FIGS. 9A–C, 10A–C, and 11A–C, showing the present invention and two prior art drills respectively. Turning first to the present invention, FIGS. 9A–C schematically illustrate the present invention. Given the design of the present invention, a full cut "a" is made across the entire diameter of bore 11 with each one-half revolution of the drill. As drill body 13 axially advances through workpiece 12, radial force E acts upon insert 30, while radial force F acts upon insert 31. Since inserts 30 and 31 are precisely and equally balanced, and diametrically opposed, forces E and F are exactly equal and cancel each other.

The significance of that balancing is best comprehended in comparison with the prior art drills shown in FIGS. 10A–C, and 11A–C. First with regard to the drill shown in FIGS. 10A–C, it can be seen that as drill body 13' axially advances through workpiece 12', radial force E' acts upon insert 30', while radial force F' acts upon insert 31'. It can also be seen, from FIG. 10C, that a full revolution of the drill is required to make a cut around the entire circumference of bore 11', in that insert 30' makes cut a', while insert 31' makes cut b'. Since forces E' and F' act in the same direction, they do not cancel each other, but rather combine to deflect the drill out of a tight rotation. This deflection is sufficient to cause edge 100 of insert 30' to rub against the inner surface of bore 11'. This deflection therefore necessarily limits prior art drills such as that shown in FIGS. 10A–C to a relatively low length to diameter ratio, in that if the deflection is great enough, the frictional engagement will overpower the motive force of the turning source, or will cause burning or scarring in the bore, or will snap body 13'.

Figure 11A:
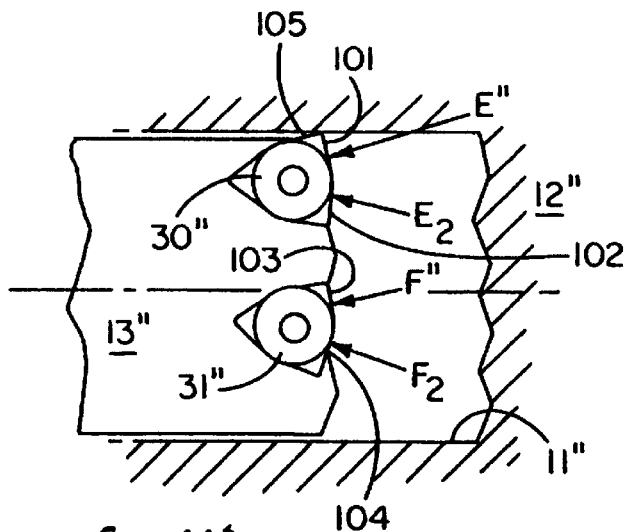
FIG. 11A is a schematic side view of another prior art drill with the workpiece bore formed by the drill shown in cross-section.
Figure 11B:
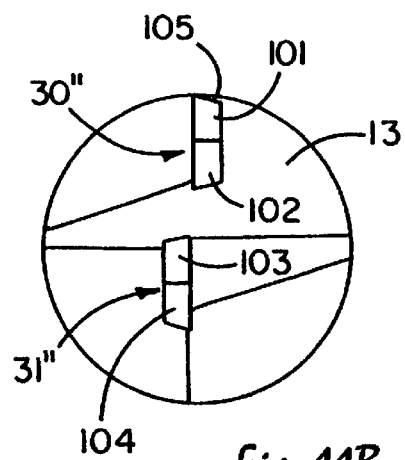
FIG. 11B is a schematic end view of the drill shown in FIG. 11A.
Figure 11C:
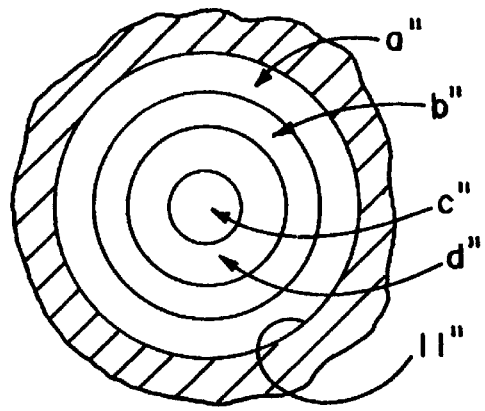
FIG. 11C is a schematic top view of the bore profile created by the drill shown in FIG. 11A.

Similarly, the drill shown in FIGS. 11A–C includes two inserts which each require a full revolution to cut a full circumferential swath in bore 11". As shown in FIGS. 11A and 11B, insert 30" includes cutting surface 101 and 102, while cutting insert 31" includes cutting surface 103 and 104. Referring now to the bore profile shown in FIG. 11C, it can be seen that cutting surface 101 creates circumferential cut a", while surface 102 makes cut b", surface 103 makes cut c", and surface 104 makes cut d". As drill body 13" axially advances through workpiece 12", radial force E" acts on surface 101, radial force $E_2$ acts on surface 102, radial force F" acts on surface 103, and radial force $F_2$ acts on surface 104. However, since the circumferential swath a" cut by surface 101 has a greater area than the circumferential swath b" cut by surface 102, forces E" and $E_2$ do not cancel each other out, and similarly forces F" and $F_2$ do not cancel each other out. The drill will therefore deflect and cause side surface 105 of insert 30" to frictionally engage the inner surface of bore 11", and will necessarily limit the length to diameter ratio that the drill can attain.

Therefore, in accordance with the present invention, two inserts are provided in precisely balanced opposite positions, with the result being the substantial cancellation of the radial forces acting on each. In addition, since each insert precisely interengages the workpiece in the same way, each insert is therefore doing exactly the same work, and the cutting forces are thereby equalized. As a result, the length to diameter ratio of the present invention is not limited to approximately three to one as are prior art devices, but can be four to one or more. In fact, tests have been successfully performed at a ratio of ten to one.

As best shown in FIG. 1, working length L of the drill is substantially greater than diameter D of tip end 14. In the embodiment shown in FIG. 1, length L is depicted as six times diameter D, although the present invention is designed to encompass all length to diameter ratios in excess of four to one. Prior to the present invention, it was believed that such length to diameter ratios were impossible due to the aforementioned radial forces imparted by the cutting surfaces engaging the workpiece, and the resulting deflection.

However, since the present invention provides cutting inserts 30 and 31 which are precisely and equally balanced such that forces E and F cancel each other, body 13 can therefore have a length L which is greater than four times diameter D.

Therefore, with the present invention, working length L of body 13 can be substantially greater than the diameter of tip end 14. In fact, tests have been successfully performed with a L/D ratio of as high as ten to one. This necessarily equates to resulting bore 11 having a substantially longer, relative to a given diameter, profile than was heretofore possible.

From the foregoing, it will be apparent that the present invention brings to the art a new and improved drill 10 with body 13 with length L which is at least four times the diameter D of tip end portion 14. Due to the use of multi-edged indexable inserts 30 and 31 which cut a full circumference of bore 11 across virtually its full diameter during each one-half revolution of the drill, the drill may be fed axially at a rapid rate. Because the inserts are triangular, adjacent corners 37 of the inserts may be positioned very close together, and yet a thick section of drill body 13 may be located between the inserts near the corners 37 so as to impart strength to the drill shank even with such high length to diameter ratios. Most importantly, due to the precise balancing of radial forces E and F acting on inserts 30 and 31, respectively, body 13 is able to maintain length to diameter ratios previously believed to result in unacceptable drill deflection.

What is claimed is:

1. A drill comprising an elongated and generally cylindrical body having a predetermined axis, the body having a shank end portion, a tip end portion having an outer periphery, and a working axial length L capable of extending into a hole formed by said drill, first and second pockets formed in a tip end portion of said body on exactly diametrically opposite sides of the axis, and first and second cutting inserts seated within said first and second pockets, respectively, and removably secured to said body, each of said inserts having substantially flat and parallel first and second faces bounded by at least three sides, at least one side of each insert having a cutting edge extending transversely of the body adjacent the tip thereof from a first corner located outwardly of said outer periphery to a second corner located short of said axis, the distance between the first corners of the first and second inserts defining a drill diameter D for the drill, the drill body having an working length L which is at least four times the drilled diameter.

2. A drill as defined in claim 1 in which the body has a working length L up to ten times the drilling diameter.

3. A drill as defined in claim 1 in which the cutting edge is straight upon proceeding from each said first corner toward said second corner and curves convexly out of the plane of said first face and toward the plane of said second face upon approaching the second corner.

4. A drill as defined in claim 3 wherein the curved portion of the cutting edge of each insert meets the plane of said second face.

5. A drill comprising:

an elongated and generally cylindrical body having a predetermined axis and rotatable in a predetermined direction about the axis, the body having a tip end portion and an opposite shank end portion, the tip end portion having an outer periphery;

first and second flutes formed in the body on generally diametrically opposite sides thereof and extending from the tip end portion toward the shank end portion, each of the flutes being generally v-shaped in radial cross-section and each being defined by a pair of walls, the first and second flutes having predetermined lengths of at least L;

first and second pockets formed in the tip end portion of the body on exactly diametrically opposite sides of the axis, the first pocket being formed adjacent one wall of the first flute, the second pocket being formed adjacent the corresponding wall of the second flute, each of the pockets being generally V-shaped and each being defined by a platform facing in the direction of rotation of the shank and by a pair of sides extending from the platform, the apex of the V of each pocket pointing toward the shank end portion of the body; and first and second cutting inserts seated within the first and second pockets, respectively, and removably secured to the body, the inserts being exactly diametrically opposed such that the radial forces acting upon each insert as the drill rotates and axially advances are precisely balanced at the predetermined axis of the tip end portion so as to avoid deflection of the tip end portion, each of the inserts being generally triangular and having one face surface seated against the platform of the respective pocket, and an opposite surface facing in the direction of rotation of the body and defining a cutting face, each of the inserts having three edge surfaces of substantially equal length and extending between the face surfaces, there being a corner at the junction of the edge surface of each insert with each adjacent edge surface, two of the edge surfaces of each insert being seated against the sides of the respective pocket, the third edge surface of each insert extending transversely of the shank adjacent the tip thereof, and a cutting edge defined along the junction of the third edge surface of each insert with a cutting face thereof, each cutting edge extending transversely of the body from a first corner of the insert located outwardly of the outer periphery toward a second corner located short of the axis, the distance between the first corners of the respective inserts establishing the drilling diameter D of the drill, each cutting edge having a straight portion which proceeds from the first corner toward the second corner and having a curved portion extending from the straight portion and curving convexly around the second corner and toward the respective platform, each insert having a radial force imparted thereon as the drill axially advances through a workpiece, the radial force on each insert being exactly equal to the precise placement of the inserts to thereby cancel each other, the working length L of the drill being at least four times the drilling diameter D.

6. A drill as defined in claim 5 in which the working length L of the drill is up to ten times the drilling diameter D.

7. A drill as defined in claim 5 in which the cutting face of each insert is generally flat but is convexly curved toward the platform adjacent the second corner so as to form the curved portion of the cutting edge.

8. A drill as defined in claim 5 in which each insert includes a third corner, there being an alternatively usable cutting edge extending from the first corner to the third corner and defined along the junction of the one face surface with one of the edge surfaces, the alternately usable cutting edge having a straight portion extending from the first corner and having a convexly curved portion adjacent the third corner.

* * * * *